United States Patent [19]

Pedersen et al.

[11] Patent Number: 4,508,263
[45] Date of Patent: Apr. 2, 1985

[54] THERMOSTATIC VALVE

[75] Inventors: Svend P. Pedersen, Nordborg; Soren N. Wrang, Sonderborg; Jens J. Molbaek, Nordborg, all of Denmark

[73] Assignee: Danfoss A/S, Nordborg, Denmark

[21] Appl. No.: 531,510

[22] Filed: Sep. 12, 1983

[30] Foreign Application Priority Data

Apr. 13, 1983 [DE] Fed. Rep. of Germany ....... 3236371

[51] Int. Cl.³ .............................................. F24F 11/02
[52] U.S. Cl. ...................... 236/42; 403/341; 403/342; 403/362
[58] Field of Search .................. 236/42; 403/341, 342, 403/362; 248/603, 616, 599

[56] References Cited

U.S. PATENT DOCUMENTS

| 362,697 | 5/1887 | Albee et al. | 403/341 X |
| 2,211,164 | 8/1940 | Rippenbein | 403/341 X |
| 2,923,906 | 2/1960 | Jonke | 403/341 X |
| 3,606,407 | 9/1971 | Pendergast | 403/341 X |
| 3,827,814 | 8/1974 | Laurent et al. | 403/341 X |
| 3,985,323 | 10/1976 | Gessler | 403/341 X |
| 4,089,461 | 5/1978 | Gocke | 236/42 |

FOREIGN PATENT DOCUMENTS

| 712775 | 10/1941 | Fed. Rep. of Germany | 403/341 |
| 640738 | 7/1950 | United Kingdom | 403/342 |

Primary Examiner—William E. Tapolcai
Attorney, Agent, or Firm—Wayne B. Easton

[57] ABSTRACT

The invention relates to a thermostatic valve assembly of the type in which a working element containing a vapor-liquid filling is housed in the temperature setting control knob. The assembly includes a housing having a projecting portion. There is a threaded adjusting connection between the knob and a base unit which is attachable to the housing projection portion. The invention is directed to specific constructions for attaching the base unit to the projection portion.

13 Claims, 4 Drawing Figures

THERMOSTATIC VALVE

The invention relates to a thermostatic valve comprising a valve housing and a thermostat attachment of which the foot of the base has slots open towards the end face, has a bearing surface with which it is pushed over a supporting surface at a housing projection surrounding the valve stem, and is surrounded by a ring which, for axial location, has an abutment face lying against an entrainment face at the foot of the base and is adjustable axially with respect to the housing by adjusting means.

In a known thermostatic valve of this kind (DEOS No. 3028658), the plastics base is provided with axial ventilating slot at its foot. The remaining foot sections have, near the free end, a radially outwardly projecting collar behind which there engages an internal rib of a metal cap nut of which the internal screw thread can be engaged with an external screw thread of the valve housing and thereby push the end face of the foot of the base against a corresponding end face that is fixed with respect to the housing.

In such thermostatic valves, because of the axial slots, there is comparatively little strength against radial or transverse forces. The slots have to be so long that the remaining foot sections can spring sufficiently inwardly to enable the internal flange of the cap nut to be pushed over the collar of the foot of the base. This resilience can be achieved either by a thin-walled foot of the base or by long slots. Both result in the aforementioned low strength.

The invention is therefore based on the problem of providing a thermostatic valve of the aforementioned kind of which the thermostat attachment is exceptionally strong against forces acting transversely to its axis.

This problem is solved according to the invention is that the foot of the base has a second annular bearing surface beyond the slots and that the housing projection extends to the zone of the second bearing surface and forms a second supporting surface therefor.

In this construction, the transverse force is already taken up by the second supporting surface so that the resilient sections of the foot of the base are no longer markedly stressed by bending. Also, comparatively large bending moments can be transmitted to the valve housing because the two bearing surfaces are pressed against the axially offset supporting surfaces from opposite sides and the ring absorbs lifting forces occurring at the free end of the resilient foot sections and transmits them as pressures to the opposite side. Tests have shown that it is in this way possible securely to retain a thermostat attachment having a thin-walled foot of the base, even if it is loaded radially by the weight of an adult.

Preferably, the ring extends axially substantially over the length of the slots and surrounds the foot of the base with no more than slight play. In this way, lifting forces are also taken up by the ring in the zone of the second supporting surface so that they act as pressures on the opposite side. Further, bowing of the resilient base sections can be substantially avoided between the bearing surfaces.

It is also favourable for the counter bearing surface on the foot of the base and the abutment face on the ring to be conical surfaces. The result of this is that, during axial location of the foot of the base, the resilient members are pressed radially inwardly against at least the first bearing surface which, in the absence of play, leads to a particularly high strength.

In a preferred embodiment, the adjusting means comprise a groove at the housing projection covered by the ring with an oblique face having an axial component and a wedge which cooperates with the oblique face and is adjustably held by the ring. In contrast with a cap nut, such adjusting means do not require a screw thread at the valve housing adjoining the first supporting surface. For this reason, the first supporting surface can be closely spaced from the valve seat so that the entire height of the valve housing provided with the projection can be within conventional dimensions despite the presence of the second supporting surface. Even if the ring significantly overlaps the slots, it has a normal and aesthetic width. For the purpose of placing on the valve housing, the free end of the base is well visible without the need for giving the ring axial mobility relatively to the foot of the base.

In a very simple embodiment, the wedge is the conical point of a screw disposed in a radially extending screw thread of the ring and engaging through the foot of the base, particularly through a slot in the foot. By turning such a sleeve screw one obtains a very secure fixing.

Another possibility giving a similar advantage is by forming the wedge on an element which extends in a slot in the foot of the base, is supported axially at the ring and is adjustable by a screw in a radially extending screw thread of the ring.

In particular, the screw should be a stud with a polygonal socket. Such a stud can be very easily adjusted with a plug spanner even if the valve is disposed at a position having difficult access. A secure fixing is therefore also possible in cases where there is no access for a screwdriver or a wrench.

Advantageously, the groove is annular with a conical oblique face. In this way, the ring can always be so set irrespective of the positioning which the valve housing is built in that either there is good access to the screw or the wedge is disposed at the top, which improves the transmission of forces to the supporting surfaces when the thermostat attachment is loaded from above.

Desirably, a lug on the ring engages in a slot at the foot of the base. This enables the desired rotary position of the ring to be located even before the attachment of the valve housing is applied.

Preferably, the lug has chamfered edges. Under resilient defamation of the base sections, the ring can be brought to a new rotary position defined by one of the slots in the foot of the base, without the need for pulling the ring off the attachment. Instead, if the ring is applied loosely, it can be secured against falling off by the abutment surface lying against the counter bearing surface of the foot of the base.

It is also advisable for the foot of the base to have axially parallel guide ribs engaging in complementary grooves of at least one supporting surface. This also secures the rotary position of the base against undesirable displacement.

Since the base is still in contact with the projection of the valve housing in the region of the second supporting surface, another feature provides that on the side of the second bearing surface remote from the slots there is a thermal barrier consisting of stiff base portions having apertures therebetween. Since this thermal barrier consists of only stiff parts, it can be made sufficiently strong to transmit transverse forces to the second supporting surface. This is likewise the case when the base is of plastics for reasons of poor heat conductivity.

In particular, thin radial walls can extend between a connecting ring carrying the second abutment face and an axially offset mounting ring. Radial walls have a high strength against transverse forces. They also possess a sufficient surface area for facilitating the dissipation of heat by convection and radiation.

For the purpose of further transverse reinforcement, the radial walls may have enlargements at their inner end.

Preferred examples of the invention will now be described in more detail with reference to the drawing wherein.

Figure 1:
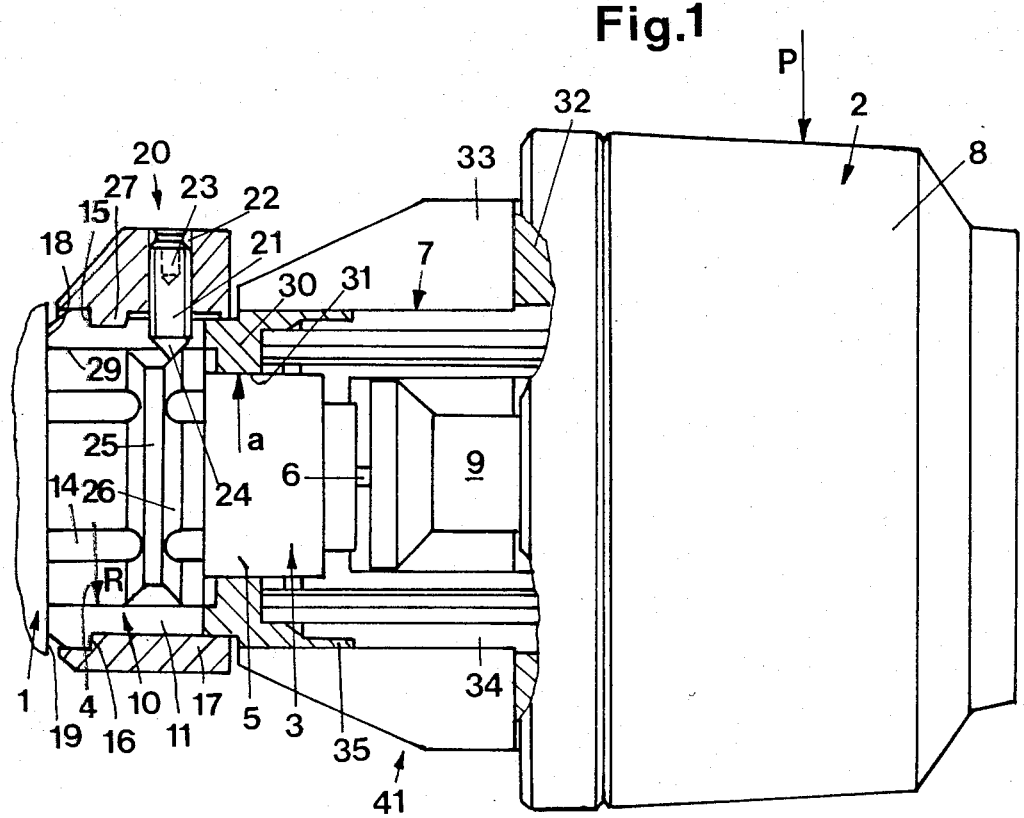
FIG. 1 is a part-sectional side elevation of a thermostat attachment placed on a valve housing in accordance with the invention.

The thermostatic valve in FIG. 1 has a valve housing 1 and a thermostat attachment 2. At the valve housing, there is a projection 3 which surrounds the valve stem and has a first cylindrical supporting surface 4 and, axially offset therefrom, a second cylindrical supporting surface 5. This projection contains a conventional seal through which a pin for actuating the valve stem is lead to the outside.

The thermostat attachment 2 comprises a fixed base 7 and a knob 8 which conventionally surrounds a thermostatic operating element and comprises setting means. Depending on the temperature and the desired setting, a setting element 9 can be displaced to actuate the pin 6 and thus the closing member of the valve. The base 7 has a foot 10 containing axial slots 11 to result in a plurality, in this case four, resilient foot sections 12. These foot sections are provided with axially parallel guide sections 13 which, when pushing over the housing projection, engage in complementary grooves 14 of the supporting surface 4. The foot sections 12 have an entrainment surface 15 which lies on an annular surface and is engaged by an annular abutment face 16 of a ring 17 of metal such as silumin, whereby to press the end face 18 of the foot of the base against a shoulder 19 of the valve housing 1. Adjusting means 20 comprise a screw 21 engaged in a radially extending screw thread 22 of the ring 17, which may be in the form of a stud having a hexagonal socket 23, and carries a wedge 24 in the form of a conical oblique surface preferably having an angle of 45°. This wedge engages in an annular groove 25 at the projection 4, which is likewise provided with an oblique surface 26. When inserting the screw 21, the ring 17 and thus the foot 10 of the base is pushed towards the end face 19 of the housing.

The axial slots 11 are so long that the foot sections 12 can be adequately deformed radially because only the ring 17 can be pushed over the front portion of the foot of the base that carries the entrainment surface 16. The axial length of the ring 17 is such that the slots 11 are almost completely covered. Near the screw thread 22, the ring 17 has a locking lug 27 which engages in one of the slots 11. The resilience of the foot sections 12 permits the applied ring 17 to be turned in steps of 90° each when the thermostat attachment 2 has not yet been placed on the valve housing 1. For this purpose, the locking lug has chamfered edges 28.

The inner surface of the foot sections 12 defines a first bearing surface 29 which is seated on the first supporting surface 4. The foot sections are seated on a connecting ring 30 of which the inner periphery forms a second bearing surface 31 seated on the second supporting surface 5. If, therefore, a transverse force P acts on the thermostat attachment 2, the second supporting surface 5 is loaded by a compressing force Q and the first supporting surface 4 by a compressing force R. In addition, the ring 17 prevents the resilient foot sections 12 from markedly lifting off the projection 3. The loads on the resilient foot sections in bending and intention are therefore extremely low. Even with a thin-walled foot of the base, there is adequate strength even for a large transverse force P of, say, 750 Newton power. Thin radial walls 33 having an angular spacing of 45° in the illustrated example extend between the connecting ring 30 and a mounting ring 32 adjacent to the knob 8. Enlargements 34 are provided at the inner end of the radial walls 33 for transverse strengthening purposes. The connecting ring 30 has a cylindrical extension 35 to facilitate a secure connection to the radial walls 33. In this way, a thermal barrier 41 is produced adjoining the foot 10 of the base.

Figure 2:
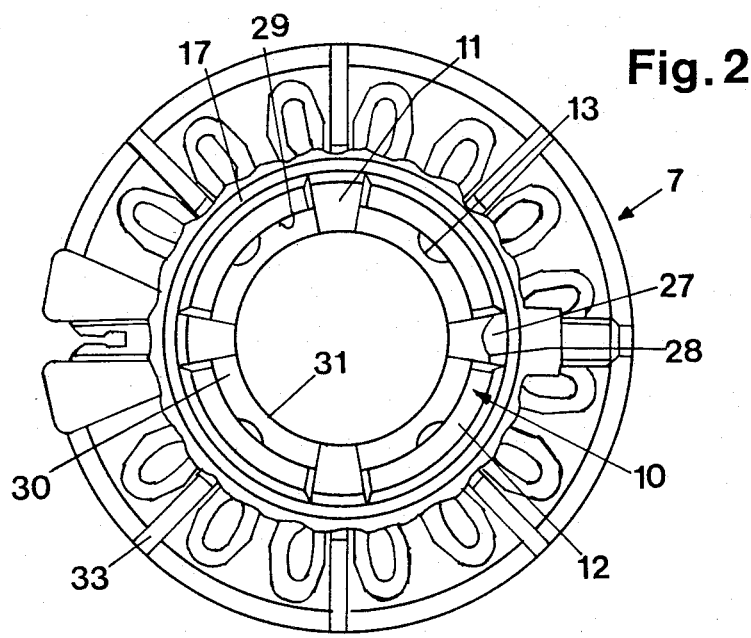
FIG. 2 is an elevation from the left of the base of the thermostat attachment with a snapped-on ring which is turned through 90° in relation to FIG. 1.
Figure 3:
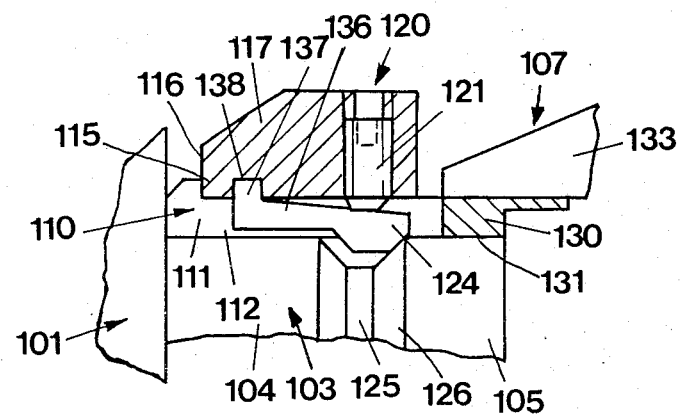
FIG. 3 is a part section of a modified embodiment of the securing position.
Figure 4:
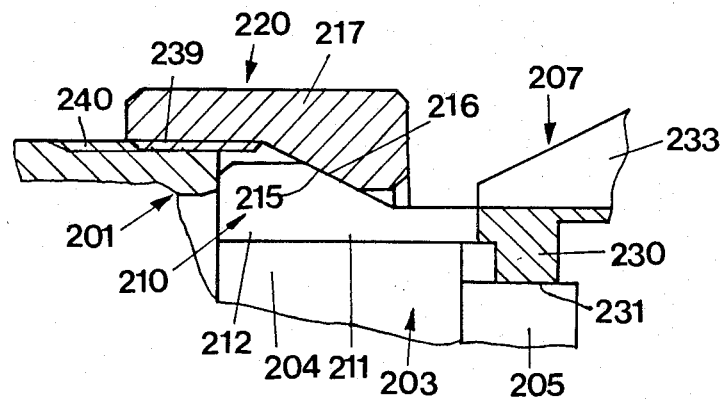
FIG. 4 is a part section of a further embodiment of the securing position.

Reference numerals increased by 100 are used in the FIG. 3 embodiment for parts corresponding to those in FIG. 1. In this case, the wedge 124 cooperating with the oblique surface 126 of the annular groove 125 is an extension on an entrainment member 136 which is inserted in an axial groove 111, loaded by a screw 121 and engages in a recess 138 of the ring by means of a lug 137. On turning the screw 121, the wedge 124 moves radially inwardly, whereby the ring 117 and thus the foot 110 of the base are displaced to the left up to abutment on the housing 101. In the FIG. 4 embodiment, reference numerals increase by 200 are employed relatively to FIGS. 1 and 2. The ring 217 is in the form of a cap nut and has a screw thread 239 by which it engages an external screw thread 240 of the housing 201. In this case, the counter bearing surface 215 at the foot 210 of the base as well as the abutment face 216 on the ring 217 are conical surfaces. When tightening the ring 217, therefore, the foot sections 212 are not only pulled against the housing 201 but also pressed radially inwardly so that there is abutment against the first supporting surface 204 without play.

The securing means as described is applicable irrespective of the principle of operation of the thermostat attachment, of whether it has a built-in sensor or a remote sensor, of whether the temperature-dependent adjustment is effected by a vapour pressure or the volumetric expansion of a liquid or a solid, and the like.

We claim:

1. A thermostatic valve assembly, comprising, a stationary valve housing having a projecting portion with first and second cylindrical supporting surfaces, a base unit fixedly connected to said projecting portion, a regulating knob mounted in rotatable relation to and axially fixed relation to said base unit, said base unit having a slotted foot portion with a first annular bearing surface pushed over said first cylindrical supporting surface, said base unit having a second annular bearing surface outwardly from said first annular surface engaging said second cylindrical supporting surface, a ring member surrounding said slotted foot portion for securing said base unit to said housing, said ring member and said slotted foot portion having abutting surfaces for maintaining said ring member in a fixed axial position relative to said slotted foot portion, and adjusting means for said base unit which includes annular groove means in said housing projecting portion and wedge means connected to said ring member, said wedge means being cooperable with said groove means to effect axial movement of said base unit relative to said housing projecting portion.

2. A thermostatic valve assembly according to claim 1 wherein said adjusting means includes screw means in a threaded bore in said ring member, said wedge means being a conical end portion of said screw means.

3. A thermostatic valve assembly according to claim 2 wherein said slotted foot portion includes axially extending slots, said screw means extending radially through one of said slots.

4. A thermostatic valve assembly according to claim 1 wherein said adjusting means includes screw means in a threaded bore in said ring member, said slotted foot portion including axially extending slots, said wedge means being an element extending in one of said slots which is actuatable by said screw means.

5. A thermostatic valve assembly according to claim 1 wherein said annular groove means has a conical oblique face.

6. A thermostatic valve assembly, comprising, a stationary valve housing having a shoulder, a valve stem and a projecting portion extending axially outwardly of the shoulder and surrounding the the valve stem, the projecting portion having a first cylindrical supporting surface and a second cylindrical supporting surface axially outwardly of the first cylindrical supporting surface, a base unit fixedly connected to said projecting portion, a regulating knob mounted in rotatable relationship to and in axially fixed relationship to said base unit, said base unit including an annular foot having a first annular bearing surface pushed over said first cylindrical surface and engaging said first cylindrical surface, and a second annular bearing surface axially outwardly of the first bearing surface engaging said second cylindrical supporting surface, said foot having a plurality of axial slots to provide a plurality of resilient foot sections that each has a first bearing surface portion for abutting against the first cylindrical supporting surface and an end surface, said second supporting and bearing surfaces extending axially outwardly of the slots and means for securing the base unit to the housing with the foot sections end surfaces pressed against the shoulder, said means including a ring member surrounding said foot sections.

7. A thermostatic valve assembly according to claim 1 wherein said ring member extends axially substantially over the length of said foot sections.

8. A thermostatic valve assembly according to claim 6 wherein said ring member and at least one of the foot sections have abutting surfaces for mounting said ring member in a fixed axial position relative to the shoulder.

9. A thermostatic valve assembly according to claim 6 wherein the ring member has a lug extending into one of said slots.

10. A thermostatic valve assembly according to claim 6 wherein the projecting portion has an axial extending groove and the foot has an axial extending guide rib extended into the groove.

11. A thermostatic valve assembly according to claim 6 wherein the diameter of the first supporting surface is greater than the diameter of the second supporting surface.

12. A thermostatic valve assembly according to claim 6 wherein said ring member has an inner peripheral annular entrainment surface axially spaced from said shoulder and having surface portions abutting against the foot sections to retain the end surfaces in abutting relationship to said shoulder and said foot sections having outer peripheral surface portions axially between the entrainment surface portions and the shoulder and of an outer diameter that is greater than the minimum inner diameter of said entrainment surface portions.

13. A thermostatic valve according to claim 12 wherein said ring member has end surfaces that are axially spaced from said shoulder.

* * * * *